United States Patent [19]

Hasegawa et al.

[11] Patent Number: 5,370,948

[45] Date of Patent: Dec. 6, 1994

[54] PROCESS FOR PRODUCTION OF POSITIVE ELECTRODE ACTIVE MATERIAL FOR NONAQUEOUS ELECTROLYTE LITHIUM SECONDARY CELL

[75] Inventors: Masaki Hasegawa; Hiroyuki Murai, both of Hirakata; Shuji Ito, Kadoma; Yasuhiko Bito; Yoshinori Toyoguchi, both of Yao, all of Japan

[73] Assignee: Matsushita Electric Industrial Co., Ltd., Japan

[21] Appl. No.: 5,981

[22] Filed: Jan. 19, 1993

[30] Foreign Application Priority Data

Jan. 17, 1992 [JP] Japan .................................. 4-006536

[51] Int. Cl.$^5$ .......................... H01M 4/32; H01M 4/50
[52] U.S. Cl. ..................................... 429/223; 429/224; 423/594
[58] Field of Search ............................... 429/223, 224; 252/182.1; 423/594, 599

[56] References Cited

U.S. PATENT DOCUMENTS

| | | | |
|---|---|---|---|
| 4,567,031 | 1/1986 | Riley | 423/594 X |
| 5,169,736 | 12/1992 | Bittihn et al. | 429/223 X |
| 5,264,201 | 11/1993 | Dahn et al. | 423/594 |

FOREIGN PATENT DOCUMENTS

| | | |
|---|---|---|
| 0017400 | 10/1980 | European Pat. Off. . |
| 0345707 | 12/1989 | European Pat. Off. . |
| 0468942 | 1/1992 | European Pat. Off. . |

OTHER PUBLICATIONS

E. Rossen, C. D. W. Jones, and J. R. Dahn; "Solid State Ionics" 57; pp. 311–318 (1992) (month unknown).

*Primary Examiner*—John S. Maples
*Attorney, Agent, or Firm*—Wenderoth, Lind & Ponack

[57] ABSTRACT

A process for the production of $LiNi_{1-x}Mn_xO_2$ ($0.005 \leq x \leq 0.45$) as a positive electrode active material for a nonaqueous lithium secondary cell comprising a) mixing aqueous solutions of a lithium salt, a nickel salt and manganese nitrate, b) heating with stirring the solution to dryness and c) pre-calcining from 250° C. to 400° C., grinding and mixing the product and finally calcining from 600° C. to 900° C.

4 Claims, 2 Drawing Sheets

PROCESS FOR PRODUCTION OF POSITIVE ELECTRODE ACTIVE MATERIAL FOR NONAQUEOUS ELECTROLYTE LITHIUM SECONDARY CELL

FIELD OF THE INVENTION

The present invention relates to a positive electrode active material for a nonaqueous electrolyte lithium secondary cell and a process for the production of the same, to which much attention has been paid recently and on which a number of developments have been achieved.

RELATED ART OF THE INVENTION

A number of studies have been made on a nonaqueous secondary cell which comprises a negative electrode made of lithium or a lithium compound since such a cell is expected to generate a high voltage at a high energy density.

Hitherto, as a positive electrode active material, an oxide of a transition metal and a chatcogen compound such as $LiCoO_2$, $LiMn_2O_4$, $LiFeO_2$, $LiNiO_2$, $V_2O_5$, $Cr_2O_5$, $MnO_2$, $TiS_2$ or $MoS_2$ have been proposed. Each of these compounds has a crystal of a layered structure or a tunnel structure which allows lithium ions to enter and leave the crystal structure. Especially, $LiCoO_2$ and $LiMn_2O_4$ draw attention for the use as the positive electrode active material for a nonaqueous electrolyte lithium secondary cell having a 4V grade.

However, $LiCoO_2$ which is the most desirable material among them in its electrical properties for the cell would increase the cost for the production thereof since Co is an expensive element. In addition, there is an uncertainty in the supply of the raw material for Co. The shortage and the increase of the price of the raw material for Co will arise if the world circumstances change. Although $LiMn_2O_4$ and $LiNiO_2$ have no problem in their production cost since manganese compounds and nickel compounds are stably supplied at very low prices as the raw materials, their properties for the cells are inferior to those of $LiCoO_2$. $LiNiO_2$ is expected to be a positive electrode active material for the lithium secondary cell having a large capacity and a high voltage since it has the same element ratio and the same crystal structure as those of $LiCoO_2$.

However, in the case in which $LiNiO_2$ is used in a cell as the positive electrode active material, the cell is inferior in the discharge capacity and the voltage, as described above, and a voltage flatness is not so good in comparison with $LiCoO_2$. Thus, there remains an object to be solved in $LiNiO_2$ for the positive electrode active material of the lithium secondary cell having the large capacity.

SUMMARY OF THE INVENTION

An object of the present invention is to stably provide a nonaqueous lithium secondary cell at a low cost which has a large discharge capacity and also provides a high voltage with solving the above problem.

According to the present invention, there is provided a lithium secondary cell comprising a positive electrode which reversibly absorbs and liberates lithium ions, a negative electrode comprising lithium or a lithium-containing compound and a nonaqueous electrolyte, wherein a positive electrode active material comprises $LiNi_{1-x}Mn_xO_2$ ($0.05 \leq X \leq 0.45$) which has a crystal structure of a hexagonal system and exhibits a peak of the (110) plane in an X-ray diffraction pattern using Cu-K$\alpha$ at $\theta$ in a range of 64.42° to 65.00°.

DETAILED DESCRIPTION OF THE INVENTION

Figure 1:
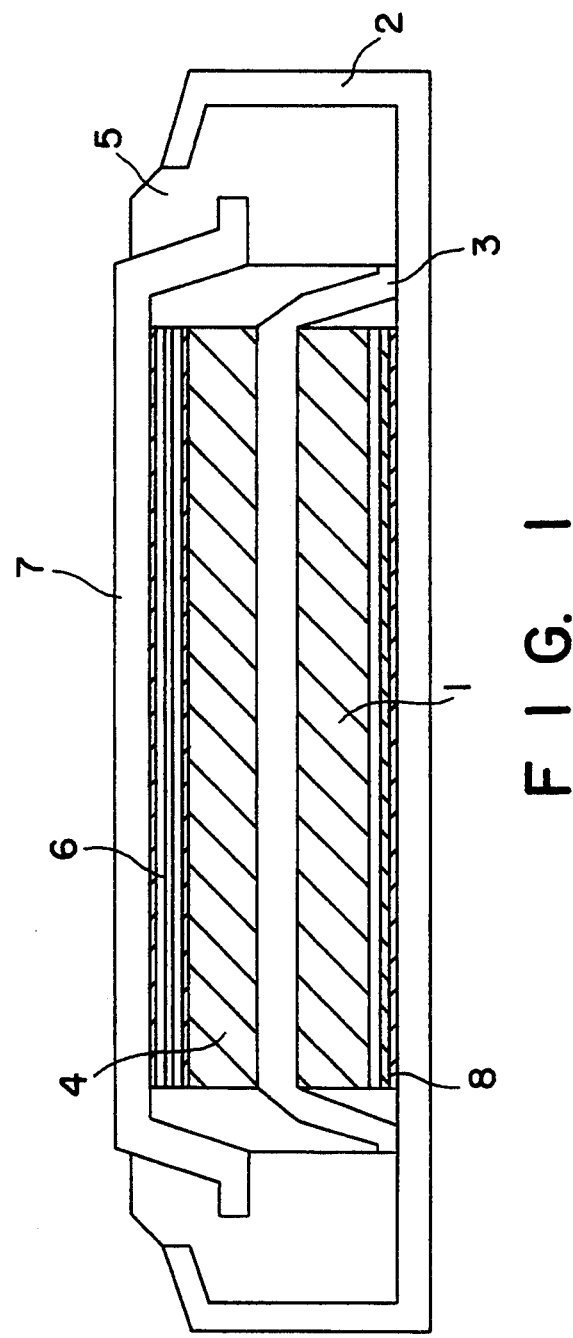
FIG. 1 schematically shows a cross sectional view of a cell according to the present invention, in which a reference number 1 indicates a positive electrode, 2 does a casing, 3 does a separator, 4 does a negative electrode, 5 does a gasket, 6 does a collector of the negative electrode, 7 does a sealing plate and does a collector of the positive electrode.

By using $LiNi_{1-x}Mn_xO_2$ ($0.05 \leq X \leq 0.45$) according to the present invention as the positive electrode active material, the nonaqueous lithium secondary cell which provides a high voltage and also has a large capacity can be stably provided at a low cost.

In the lithium cell according to the present invention, there is contained a compound as one oxide component of a composite oxide of nickel and lithium which can be expressed in the same element ratio as that of $LiNiO_2$. $LiNiO_2$ has the same crystal structure as that of $LiCoO_2$ and thus there is a possibility that it exhibits effective properties as the positive electrode active material for the nonaqueous lithium secondary cell. However, in fact, $LiNiO_2$ has not so good properties as $LiCoO_2$. In addition, synthesis of $LiNiO_2$ is carried out without good reproducibility of the properties and thus the stable production of $LiNoO_2$ is not easy.

However, when a portion of nickel of $LiNiO_2$ is replaced with manganese to have a new compound $LiNi_{1-x}Mn_xO_2$, the properties thereof for the cell are highly improved and, at the same time, the synthesis of the compound becomes easy, so that $LiNi_{1-x}Mn_xO_2$ having stable properties is produced. Although not bound by any theory, this may be because a structural change is caused by the partial replacement of nickel ions with manganese ions in the crystal lattice which allows lithium ions to enter and leave the structure easily and also because the framework of the transition metal and oxygen is stabilized by the replacement.

Peak positions in the X-ray diffraction pattern of $LiNi_{1-x}Mn_xO_2$ slightly shift from that of $LiNiO_2$. For example, a peak position of the (110) plane of $LiNiO_2$ is at $2\theta$ of 64.41°, while that of $LiNi_{1-x}Mn_xO_2$ (x=0.2) is at $\theta$ of 64.52°. When x is further increased, $\theta$ increases above 65° C. However, such a compound having the relatively larger x does not have good properties for the cell.

$LiNiO_2$ is synthesized by a reaction of anhydrous lithium hydroxide and metal nickel in an atmosphere comprising oxygen as described in J. Am. Chem. Soc., Vol. 76, p. 1499 (1954). Alternatively, $LiNiO_2$ is produced by reacting lithium hydroxide with nickel nitrate. Both products produced by the two syntheses had the same properties for the positive electrode active material. However, the compound according to the present invention in which a portion of nickel is replaced with manganese was not synthesized by a reaction of anhydrous lithium hydroxide with metal nickel and metal manganese under an oxygen atmosphere.

Then, the inventors have made extensive studies for the production for $LiNi_{1-x}Mn_xO_2$ and have found that the compound $LiNi_{1-x}Mn_xO_2$ having a single phase and exhibiting good properties for the electrode is easily produced by using a lithium salt and a nickel salt as the starting materials and further a manganese nitrate as a manganese source and by heating to calcine them. When other manganese compound is used as the manganese source except manganese nitrate, the cell capacity is also increased compared with the absence of manganese, which increase is not so large as in the case in which manganese nitrate is used.

EXAMPLES

The present invention will be, hereinafter, described in detail with reference to following Examples.

Example 1

In this Example, as the positive electrode active material, a product from lithium hydroxide ($LiOH.H_2O$), nickel nitrate ($Ni(NO_3)_2.6H_2O$) and manganese nitrate ($Mn(NO_3)_2.6H_2O$) as the starting materials was used, and lithium was used as the negative electrode active material.

Each starting material was dissolved in an aqueous solution. The concentration of lithium hydroxide was 4.5 mol/l, and the concentrations of nickel nitrate and manganese nitrate were 1 mol/l, respectively. Then, the aqueous solutions were charged in a vessel to have a solution mixture of which element ratio of lithium, nickel and manganese was as desired. Then, the mixture was further mixed with keeping its temperature at 60° C. After sufficient mixing, the mixture was thoroughly dried by means of evaporating water at around 90° C. to have a solid material, which was ground into powder. The powder was pre-heated (or pre-calcined) at a temperature of 300 ° C. in the air and calcined at a temperature of 800° C. in the air to obtain $LiNi_{1-x}Mn_xO_2$.

Various $LiNi_{1-x}Mn_xO_2$ compounds in which x is 0.05, 0.1, 0.2, 0.3, 0.4, 0.45, and 0.5 were produced in the same manner as described above, respectively. In addition, a compound which contains no manganese, namely x=0, was also produced for comparison. According to results of the X-ray diffraction, each compound was found to have a single phase.

A positive electrode was formed using each calcined material as the positive electrode active material. Firstly, the calcined material, acetylene black as a conducting agent and a polyethylene fluoride resin as a binder were mixed at a weight ratio of 7:2:1 so that a positive electrode material was obtained after thoroughly drying them. The positive electrode material of 0.15 g was press molded at a pressure of 2 ton/cm² to have a positive electrode pellet having a diameter of 17.5 min.

The cell comprising the positive electrode formed as described above is schematically shown in a cross sectional view in FIG. 1, in which a negative electrode was a lithium plate having a diameter of 17.5 mm and a thickness of 0.8 mm, a separator was made of a porous polypropylene film, and propylene carbonate as a nonaqueous electrolyte was used in which lithium perchlorate was dissolved at 1 mol/l.

The lithium cells which had the electrodes comprising, as the positive electrode active material, the compounds in which x is 0, 0.05, 0.1, 0.2, 0.3, 0.4, 0.45 and 0.5, respectively were compared in their discharge capacities. The charge and discharge condition was voltage limitation within a range of 3.0 V to 4.3 V at a constant current of 1.5 mA.

Figure 2A:
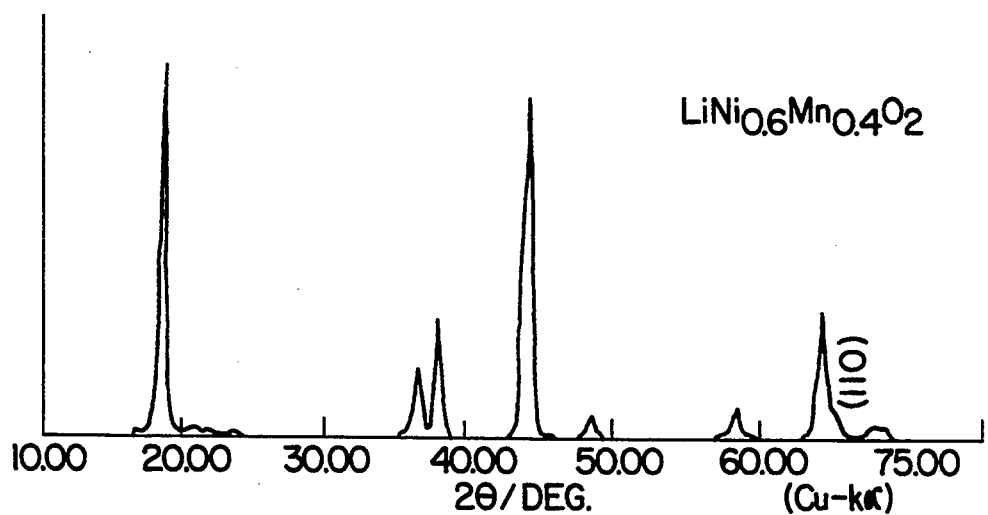
FIG. 2 shows X-ray diffraction patterns of various lithium compounds.
Figure 2B:
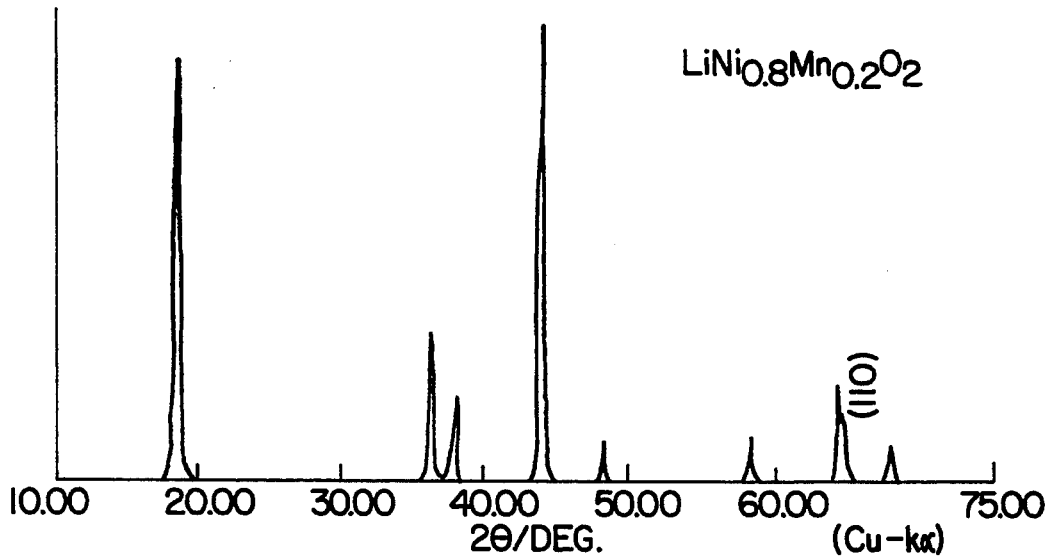
Figure 2C:
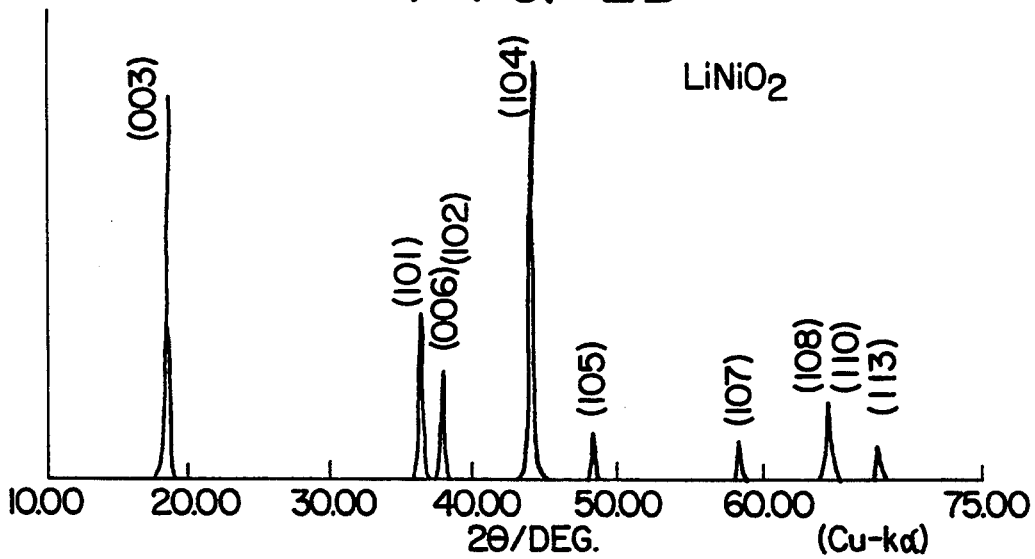

The X-ray diffraction patterns of the compounds are shown in FIG. 2 in which x is 0, 0.2 and 0.4, respectively. The below Table 1 shows the comparison results of the discharge capacity and an average discharging voltage in the second cycle together with the peak position of the (110) plane of each compound.

TABLE 1

| x | Discharge Capacity in Second Cycle (mAh) | Average Discharge Voltage (V) | Peak Position of (110) Plane ($2\theta$, deg.) |
|---|---|---|---|
| 0 | 9.05 | 3.65 | 64.41 |
| 0.05 | 10.75 | 3.70 | 64.43 |
| 0.1 | 12.08 | 3.73 | 64.44 |
| 0.2 | 13.87 | 3.76 | 64.52 |
| 0.3 | 13.38 | 3.75 | 64.68 |
| 0.4 | 11.80 | 3.72 | 64.89 |
| 0.45 | 10.88 | 3.70 | 64.98 |
| 0.5 | 9.28 | 3.68 | 65.05 |

As seen from above Table 1, the discharge capacity of the cell which comprises the positive electrode formed from the compound containing manganese is increased when compared with the cell which comprises the positive electrode formed from the compound containing no manganese (x=0). The discharge capacity is 9.05 mAh and the average discharge voltage is 3.65 V when x is 0. On the contrary, when x is 0.2, the discharge capacity is 13.87 mAh and the average discharge voltage is 3.76 V, and thus, the effect of the present invention is most effectively obtained. When x is 0.5, the capacity is almost the same as that when x is 0. However, when x is 0.45, the discharge capacity is 10.88 mAh and the average discharging voltage is 3.70 V, the effect of the addition of manganese still appears compared with the case in which x is 0.

As to the X-ray diffraction patterns shown in FIG. 2, the patterns when x is 0 and when x is 0.2 are similar to each other. However, in the pattern when x is 0.4, the peaks become relatively broad and intensity ratios are also changed.

As to the peak position of the (110) plane in the X-ray diffraction pattern, each compound containing manganese at x in a range of 0.05 to 0.45 has the peak position at $2\theta$ within a range of 64.42° to 65.00°. However, when x is 0.5, $\theta$ is 65.05° which is above 65.00°. When x is 0, $2\theta$ is 64.41°.

As shown in the above results, the discharge capacity can be increased by the replacement of a portion of nickel ions of $LiNiO_2$ with manganese ions. Especially, it is most preferable that about 20% of nickel ions are replaced with the manganese ions.

Example 2

In this Example, Example 1 was repeated except that x was fixed to 0.2 and the preheating temperature was variously changed. For determination of the effect of the o preheating temperature, the discharge capacity in the second cycle of the each cell was measured. The results are shown in below Table 2.

TABLE 2

| Preheating Temperature (°C.) | Discharge Capacity in Second Cycle (mAh) |
|---|---|
| 200 | 9.21 |
| 250 | 13.75 |
| 300 | 13.87 |
| 400 | 13.81 |
| 450 | 10.24 |

As seen from above Table 2, when the preheating temperature, namely a temperature of the first thermal treatment, is in a range of 250° C. to 400° C., the cell having the larger capacity is produced.

Example 3

In this Example, Example 1 was repeated except that x was fixed to 0.2 and the calcining temperature was variously changed. For determination of the effect of the calcining temperature, the discharge capacity in the second cycle of each cell was measured. The results are shown in below Table 3.

TABLE 3

| Calcination Temperature (°C.) | Discharge Capacity in Second Cycle (mAh) |
|---|---|
| 550 | 8.32 |
| 600 | 12.34 |
| 700 | 13.70 |
| 800 | 13.87 |
| 900 | 11.96 |
| 950 | 7.26 |

As seen from above Table 3, when the calcination temperature, namely a temperature of the second thermal treatment, is in a range of 600° C. to 900° C., the cell having the larger capacity is produced. When the calcination temperature is less than 600° C., the reaction does not proceed sufficiently. When the temperature is above 900° C., a crystal phase having the less properties is stably produced. Thus, the calcination temperature is preferably in a range of 600° C. to 900° C.

Example 4

In this Example, the positive electrode active materials were formed from various lithium sources, various nickel sources and manganese nitrate ($Mn(NO_3)_2$) as the manganese source and x was fixed to 0.2. As the negative electrode active material, lithium was used.

Each starting materials was charged into a mortal so that x was 0.2 in $LiNi_{1-x}Mn_xO_2$ and mixed thoroughly therein. The resultant mixture was calcined at a temperature of 650° C. to produce $LiNi_{0.8}Mn_{0.2}O_2$.

The positive electrodes were formed using $LiNi_{0.8}Mn_{0.2}O_2$ from the different starting materials as the positive electrode active material. Firstly, the calcined material ($LiNi_{0.8}Mn_{0.2}O_2$) as the active material, the acetylene black as the conducting agent and the polyethylene fluoride resin as the binding agent were mixed at a weight ratio of 7:2:1 so that the positive electrode material was obtained after thoroughly drying. The positive electrode material of 0.15 g was press molded at a pressure of 2 ton/cm$^2$ to have the positive electrode pellet having a diameter of 17.5 mm.

The cell comprising the positive electrode formed as described above is the same as in FIG. 1, in which a negative electrode was a lithium plate having a diameter of 17.5 mm and a thickness of 0.8 mm, a separator of a porous polypropylene film was used, and a propylene carbonate was used as the nonaqueous electrolyte in which lithium perchlorate was dissolved at 1 mol/l.

The cells each comprising the positive electrode active material produced from different starting materials were compared in their discharging capacities. The charge and discharge condition was the voltage limitation within a range of 3.0 to 4.3 V at a constant current of 1.5 mA. The results are shown in Table 4.

TABLE 4

| Comparison of Discharge Capacity at Second Cycle (mAh) | | | |
|---|---|---|---|
| Source | $Ni(NO_3)_2$ | $Ni(OH)_2$ | $NiCO_3$ |
| $LiNO_3$ | 10.21 | 13.68 | 13.91 |
| LiOH | 9.65 | 7.86 | 1.92 |
| $Li_2CO_3$ | 8.54 | 2.53 | 2.23 |

As seen from above Table 4, when $LiNO_3$ is used as the lithium salt and basic $NiCO_3$ or $Ni(OH)_2$ is used as the nickel salt, the cell having the larger capacity is produced.

Example 5

Example 4 was repeated except that lithium nitrate ($LiNO_3$) as the lithium source, basic nickel carbonate ($NiCO_3 \cdot Ni(OH)_2$) and various manganese salts for the manganese source were used as the starting materials. For comparison, a product in which x was 0 was also produced in the same manner. In addition to the measurement of the discharge capacity, the peak position of the (110) plane in the X-ray diffraction pattern and the average voltage of the second cycle were also measured. The results are shown in Table 5.

TABLE 5

| Manganese Source | Discharge Capacity in Second Cycle (mAh) | Average Discharge Voltage (V) | Peak Position of (110) Plane (2θ, deg.) |
|---|---|---|---|
| $Mn(NO_3)_2 \cdot 6H_2O$ | 13.91 | 3.76 | 64.55 |
| $Mn_3O_4$ | 9.58 | 3.65 | 64.41 |
| $MnO_2$ | 8.79 | 3.64 | 64.35 |
| $MnCO_3$ | 8.82 | 3.65 | 64.39 |
| Non (Comparative Example) | 9.28 | 3.65 | 64.41 |

As seen from above Table 5, when manganese nitrate is used as the manganese source, the larger discharge capacity such as 13.91 mAh is achieved. When trimanganese tetraoxide is used, the discharge capacity is also increased, but its increase extent is not so large as when manganese nitrate is used. On the contrary, when manganese dioxide or manganese carbonate is used, the discharge capacity is decreased.

As to the peak position of the (110) plane in the X-ray diffraction pattern, when manganese nitrate is used, 2θ is 64.55°. This peak position is within a range of 64.42° to 65.00°. However, when manganese dioxide is used or when manganese carbonate is used, 2θ is 64.35° or 64.39° which is below 64.42°.

As seen from above results, when manganese nitrate ($Mn(NO_3)_2 \cdot 6H_2O$) is used as the manganese source in order to replace a portion of Ni with Mn, the cell having the larger capacity is produced. When other manganese source is used, the replacement effect is not so large as that when manganese nitrate is used.

Example 6

Example 5 was repeated except that $Ni(OH)_2$ was used in place of basic nickel carbonate. The results are shown in below Table 6.

TABLE 6

| Manganese Source | Discharge Capacity in Second Cycle (mAh) | Average Discharge Voltage (V) | Peak Position of (110) Plane (2θ, deg.) |
|---|---|---|---|
| $Mn(NO_3)_2 \cdot 6H_2O$ | 13.68 | 3.76 | 64.51 |

TABLE 6-continued

| Manganese Source | Discharge Capacity in Second Cycle (mAh) | Average Discharge Voltage (V) | Peak Position of (110) Plane (2θ, deg.) |
|---|---|---|---|
| $Mn_3O_4$ | 9.59 | 3.65 | 64.42 |
| $MnO_2$ | 8.61 | 3.64 | 64.33 |
| $MnCO_3$ | 8.69 | 3.65 | 64.38 |
| Non (Comparative Example) | 9.28 | 3.65 | 64.41 |

As seen from above Table 6, when $Mn(NO_3)_2 \cdot 6H_2O$ is used as the manganese source, the cell having the larger capacity is produced as in Example 5.

Example 7

Example 5 was repeated so as to determine the effect of the calcination temperature in detail except that $Mn(NO_3)_2 \cdot 6H_2O$ was used as the manganese source and the calcination was carried out at various temperatures. In this Example, the discharge capacity was measured, in addition to in the second cycle, in the first cycle and the tenth cycle to obtain a maintaining ratio of the discharge capacity in the tenth cycle to the first discharge capacity. The results are shown in below Table 7.

TABLE 7

| Calcination Temperature (°) | Discharge Capacity (mAh) | Maintaining Ratio of Discharge Capacity in Tenth Cycle (%) |
|---|---|---|
| 580 | 8.96 | 72.6 |
| 600 | 12.41 | 89.1 |
| 620 | 13.62 | 95.6 |
| 650 | 13.91 | 97.3 |
| 700 | 14.21 | 88.4 |
| 720 | 14.23 | 73.6 |
| 750 | 14.25 | 70.3 |
| 800 | 14.04 | 66.2 |
| 900 | 12.35 | 61.6 |
| 950 | 5.62 | 58.1 |

As seen from above Table 7, as to the discharge capacity, the calcination temperature in a range of 600° C. to 900° C. provides the cell having the larger capacity. However, when attention is paid on the maintaining ratio of the discharge capacity, the calcination temperature above 700° C. adversely affects on the maintaining ratio. Therefore, the calcination temperature in a range of 600° C. to 700° C. is the most preferable.

Example 8

Examples 5 and 6 were repeated except that only $Mn(NO_3)_2$ was used as the manganese source and the calcination was carried in an oxygen atmosphere in place of in the air in which other Examples were carried out. In principle, since the nickel salt used as the starting material contains a bivalent nickel and the product ($LiNi_{1-x}Mn_xO_2$ wherein $0.05 \leq X \leq 0.45$) contains a trivalent nickel, the atmosphere under which the calcination is carried out should be an oxidizing one. The results are shown in below Table 8.

TABLE 8

| Nickel Source | Discharge Capacity in Second Cycle (mAh) |
|---|---|
| $Ni(OH)_2$ | 17.52 |
| $NiCO_3$ | 17.96 |

It is seen from the results that the calcination under the oxygen atmosphere provides the cell having the larger discharge capacity.

As seen from the above Examples, there is stably and easily provided, at a low cost, the lithium secondary cell having the higher output voltage and the larger capacity when the cell comprises the positive electrode which can reversibly absorb and liberate lithium, the negative electrode comprising lithium or the lithium compound containing lithium as the main component and the nonaqueous electrolyte wherein $LiNi_{1-x}Mn_xO_2$ ($0.05 \leq X \leq 0.45$) is included as the positive electrode active material which has the crystal structure of the hexagonal system and exhibits the peak of the (110) plane in the X-ray diffraction pattern using Cu-Kα at θ in a range of 64.42° to 65.00°.

What is claimed is:

1. A process for the production of $LiNi_{1-x}Mn_xO_2$ ($0.05 \leq X \leq 0.45$) as a positive electrode active material for a nonaqueous lithium secondary cell which has a crystal structure of a hexagonal system and exhibits a peak of the (110) plane in an X-ray diffraction pattern using Cu-Kα at 2θ in a range of 64.42° to 65.00°, comprising the steps of:
   a. mixing aqueous solutions of a lithium salt, a nickel salt and manganese nitrate;
   b. heating with stirring the mixed aqueous solution to dryness followed by:
   c. a thermal treatment comprising pre-calcining at a temperature within the range of 250° C. to 400° C., grinding and mixing said pre-calcined product and then calcining at a temperature within the range of 600° C. to 900° C.

2. The process according to claim 1, wherein lithium hydroxide is used as the lithium salt and nickel nitrate is used as the nickel salt.

3. The process according to claim 1, wherein at least one of nickel carbonate and nickel hydroxide is used as the nickel salt and lithium nitrate is used as the lithium salt.

4. The process according to claim 1, wherein the thermal treatment is carried out in an oxidizing atmosphere selected from an air atmosphere and an oxygen atmosphere.

* * * * *